UNITED STATES PATENT OFFICE

JAGAN N. SHARMA, OF SAN JOSE, CALIFORNIA, ASSIGNOR TO FOOD MACHINERY CORPORATION, OF SAN JOSE, CALIFORNIA, A CORPORATION OF DELAWARE

METHOD OF CANNING VEGETABLES

No Drawing. Application filed July 6, 1931. Serial No. 549,099.

This invention relates to the art of preparing vegetables for canning and has to do with a novel method of treating such vegetables so that the necessary processing steps may be carried out without destruction of the vegetable coloring matter.

Although the process, according to my invention, may be utilized in connection with the canning of various kinds of vegetables, such as spinach, peas, beans, and so forth, for the purpose of this disclosure I shall describe the same as employed in the canning of spinach, it being understood that the process is not limited thereto but may embrace other vegetables as well, so that the term "spinach", as used herein, is intended to include such other vegetables.

In the customary method of canning spinach, the spinach, after being washed, is subjected to a short blanching operation which amounts, in effect, to a brief preliminary cook. This serves the purpose of reducing the air content and the bulk of the spinach so that the desired weight may be introduced into the cans. After the blanching operation the spinach is filled in the cans, covered with salt brine, and the cans are thereafter exhausted, sealed and cooked until sterilization takes place.

This method of canning spinach has the disadvantage that the canned product does not retain the fresh green color of the growing vegetable, but assumes a dull brownish green color which is unpleasant to the eye and, consequently, not as appetizing as it might be if the fresh green color were retained. This undesirable change of color appears to be due to the action of the organic acids contained in the vegetable which, under the application of heat, react with the chlorophyll so as to destroy it and produce the brownish green color referred to. As the blanching period is only from a minute and a half to three minutes duration, this reaction usually does not progress very far during the blanching operation, but largely occurs in the cooking operation after the cans are sealed and to which the canned product is subjected for a materially longer period.

It is a prime object of my invention to provide a process of canning vegetables whereby the natural color of the vegetable is preserved in the canned product.

Another object is to treat the vegetables during the preliminary steps of the canning process in such manner that they may be cooked without danger of destroying or changing the coloring matter therein.

A further object is to provide a method of preparing vegetables for canning whereby the organic acids contained in the vegetables are neutralized so that they cannot react with the chlorophyll during the cooking process to change the color of the vegetable.

A still further object is to treat the vegetables prior to canning with an alkaline solution of such character as to neutralize the organic acids contained in the vegetables, without affecting the tissue of the vegetables.

These and other objects and advantages will become more apparent as the disclosure of the invention proceeds, it being understood that variations and modifications may be resorted to without departing from the spirit or scope of the invention as set forth herein, and in the claims appended hereto.

In accordance with the principles of my invention I have discovered that if the organic acids contained in the vegetable are neutralized before cooking of the vegetable has progressed to any material extent, further cooking may be carried on without danger of destroying or changing the chlorophyll of the vegetable.

This neutralization of the organic acids may be accomplished by treating the vegetable with any mildly alkaline solution, but the difficulty arises with most such solutions that they not only neutralize the acids but go further and attack the tissue of the vegetable to a more or less extent, so that while the color is preserved the tissue is so affected that its structure is broken down, resulting in an unsatisfactory product and clouding the solution.

I have found that magnesium carbonate may be used with excellent results, as a solution may be prepared therefrom which is mild enough in its action so that while readily neutralizing the organic acids of the vegetable it will not attack the tissue. Moreover, magnesium carbonate is edible so that after it is applied to the vegetable it is not necessary to wash it off unless desired. This characteristic also makes it possible to put the magnesium carbonate into the cans along with the brine if desired, instead of being applied in the blanching water.

Other carbonates of the alkaline earth metal family might be used instead of magnesium carbonate, as for example, calcium carbonate. However, being inedible, it is necessary that the vegetables be thoroughly washed after being treated with solutions of these carbonates.

The most suitable strength of solution will, of course, vary according to the character of vegetable being treated, but should be such as to effect neutralization of the organic acids without affecting the tissue. If too strong a solution is used it may not only neutralize the acids but also react with the tissue to destroy the same. On the other hand, if too weak a solution be used, the acids may not be entirely neutralized so that the most satisfactory results may not be obtained. I have found that in the case of spinach best results are obtained by using a magnesium carbonate solution of a strength between .05 of 1% and .154 of 1%. Since a .154 of 1% solution of magnesium carbonate is a saturated solution, this is as strong a solution as can be prepared from magnesium carbonate. Any added amount over and above this value will simply remain in suspension without affecting the spinach in any way. This characteristic of magnesium carbonate makes it particularly suitable for the purpose as it can be used without fear of getting too strong a solution.

If any other base is used in place of magnesium carbonate, the amount used to prepare the solution should be such as to make the alkalinity of the solution equivalent to that of a magnesium carbonate solution of .05% to .154%. It will be understood, of course, that milder or stronger solutions might be used with more or less satisfactory results and the invention is not limited to these specific values, which are given simply as illustrative of good, average practice. Generally speaking, however, if the solution is made stronger or milder, the results become less and less satisfactory, on account of destruction of the tissue by the solution in the first case, or under-neutralization of the acids in the latter case.

In carrying out the process according to my invention, the spinach may be treated with the alkaline solution either by adding a suitable base to the blanching water or by adding it to the brine which is poured over the spinach after it is put into the cans. In the latter case an edible base such as magnesium carbonate must be selected, since the brine is sealed in the cans. The treatment may also be made a separate step in the process if desired.

When the treatment is to be applied during the blanching step, the base, such as for example magnesium carbonate, is added to the blanch water so as to make a solution of from .05 to .154 of 1% solution, and the blanching is carried out in the usual manner using this solution in the place of the usual blanching water. After blanching, the spinach may or may not be washed, as desired. Since magnesium carbonate is edible, it is not necessary to wash the spinach after blanching with this solution. However, if a non-edible base be used, the vegetables should be thoroughly washed.

After blanching, the treatment of the spinach may continue in the usual manner, that is to say, it may be filled in the cans, covered with brine and exhausted, after which the cans may be sealed and cooked until the contents are sterilized. On account of the neutralization of the acids in the spinach during the blanching operation, due to the action of the magnesium carbonate, the cooking process does not affect its color, so that the final product retains the fresh green color of the fresh vegetable. Moreover, on account of the mildness of action of the magnesium carbonate, the tissue of the spinach is not affected thereby but remains whole and firm.

As above noted, it is not essential that the magnesium carbonate be placed in the blanching water, but may be placed in the brine with which the spinach is covered after it is filled into the cans, the same strength of solution being used. When this is done the blanching is carried out in the usual manner, using plain water and after the spinach is placed in the cans and brined with the solution containing the magnesium carbonate the cans are sealed and cooked in the usual manner. The effect of this procedure is the same as when the magnesium carbonate is added to the blanch water, since the neutralization of acid occurs before it can destroy the chlorophyll in the cooking operation.

The treating solution may also be applied to the spinach between the blanching step and the brining step if desired, that is to say, after the spinach has been blanched it may then be treated with a solution of magnesium carbonate before it is filled into the cans and covered with brine. The spinach may be washed after treatment or not, as desired.

Having now described my invention and in what manner the same may be practiced, what I claim as new and desire to protect by Letters Patent is as follows:

1. The process of treating vegetables for canning including applying to said vegetables a solution of magnesium carbonate.

2. The process of canning vegetables comprising blanching the vegetables in a solution of magnesium carbonate, and thereafter sealing them in containers and heating them until sterilized.

3. The process of treating vegetables for canning including heating said vegetables in a solution of magnesium carbonate.

4. The process of canning vegetables comprising blanching the vegetables, then filling them into containers and covering them with a solution of magnesium carbonate, and thereafter sealing the containers and heating them until the vegetables are sterilized.

5. In the canning of vegetables, the method of preserving their green color, which comprises heating the vegetables in a solution of magnesium carbonate having a concentration from .05% to .154%.

6. In the canning of vegetables, the method of preserving their green color, which comprises heating the vegetables in a saturated solution of magnesium carbonate containing an excess of magnesium carbonate suspended in the solution.

Signed at San Jose, California, this 27th day of June, 1931.

JAGAN N. SHARMA.